United States Patent [19]

Serrao

[11] 4,363,228
[45] Dec. 14, 1982

[54] LOCKING MECHANISM FOR RANGES

[76] Inventor: Carlton Serrao, 535 Parkside Ave., Apt. 6N, Brooklyn, N.Y. 11226

[21] Appl. No.: 209,594

[22] Filed: Nov. 24, 1980

[51] Int. Cl.³ .......................... F16K 35/00; F24C 3/12
[52] U.S. Cl. ....................................... 70/177; 70/184; 70/211
[58] Field of Search ................. 70/177, 178, 175, 176, 70/183, 184, 210, 211, DIG. 63; 126/42

[56] References Cited

U.S. PATENT DOCUMENTS

| 1,442,008 | 1/1923 | Sindler | 126/42 |
| 2,116,885 | 5/1938 | Friedman | 126/42 |
| 2,489,611 | 11/1949 | Becvar | 126/42 |
| 2,525,562 | 10/1950 | Reeves | 126/42 |
| 2,777,316 | 1/1957 | Mello | 70/177 |

Primary Examiner—Robert L. Wolfe
Attorney, Agent, or Firm—Robert D. Farkas

[57] ABSTRACT

A locking mechanism for ranges utilizes a bar extending transverse to the longitudinal axis of the knob operated shafts controlling the operation of the individual valves of a gas range or the individual switches of an electric range. A plurality of arms are pivotably secured to the bar, each having fingers directed and biased towards the longitudinal axis of each shaft. Each shaft is rotatable and carries an opening at a discrete location in the surface thereof. Rotating the shaft to a position corresponding to deenergizing the associated heating element of the range into an off position permits the free end of the finger to enter the opening, preventing further rotation of the shaft when the bar is slidably positioned into a locked position by the operation of a key operated lock. When the lock is placed in an unlocked position, the bar is slidably displaced permitting those fingers engaged within associated openings to become disengaged, thereby allowing all of the shafts to be manually independently operated.

3 Claims, 4 Drawing Figures

LOCKING MECHANISM FOR RANGES

BACKGROUND OF THE INVENTION

1. The Field of the Invention

This invention relates to safety locking devices for ranges and more particularly to that class of device which enables the user to manually operate one or more range control shafts when the range safety device is maintained in a locked position.

2. Description of the Prior Art

The prior art abounds with fuel control and safety devices for ranges. Typical of such prior art devices are the disclosures contained within U.S. Pat. No. 2,777,316 issued on Jan. 15, 1957 to A. Mello and U.S. Pat. No. 2,834,335 issued May 13, 1958 to A. Rondello and U.S. Pat. No. 2,489,611 issued on Nov. 29, 1949 to J. Becvar and U.S. Pat. No. 3,035,567 issued on May 22, 1962 to H. M. Reeves.

All of the aforementioned patents teach the concurrent locking of all of the range operating shafts or teach the individual locking of one such shaft. These disclosures do not permit the user to place the locking mechanism in a locked position wherein all of the range operating shafts are concurrently locked against further operation operation whilst allowing the user to operate one or more shafts prior to the time that such shafts are rotatably aligned with the locking mechanism thereby causing such shafts to thereafter remain locked.

SUMMARY OF THE INVENTION

A primary object of the present invention is to provide a range locking mechanism which prohibits the unauthorized use of the range operating shafts after the shafts have been operated into a preselected position and the lock is operated into the locked position.

Another object of the present invention is to provide a safety apparatus which enables the user to operate the range after the locking mechanism is locked and before all the operating shafts are rotatably aligned into a position deactivating the range heating devices.

Still another object of the present invention is to provide a safety device wherein it is impossible to lock the operating shafts into a position where the range heating devices are continuously activated.

Yet another object of the present invention is to provide a range safety device which may be added to existing ranges without substantially modifying the constructional features of the range.

A further object of the present invention is to provide a safety device in accordance with the preceding objects, which is simple in construction, relatively inexpensive and effective for its particular purposes.

Ranges represent a potential fire and safety hazard when operated by children or other unauthorized personnel. The present invention permits the shafts, designed to rotatably operate control elements, such as valves for gas operated ranges and switches for electrically operated ranges, to be either all simultaneously locked into the off position or some of the shafts being locked against further rotation whilst the remaining unlocked shafts can be operated until such time that the remaining shafts are rotated into the off position, causing them to remain locked in the off position until the locking mechanism is placed into an unlocked position. Thus the user can lock the key operated locking device and continue to utilize the range in an activated condition until all the shafts are simply rotated to the off position. Thereafter, the range may not be activated until the key operated lock is placed in the unlocked position, permitting all the shafts to be freely operated at the will of the user. This arrangement enables the authorized use of one or more selected range heating devices until such time that the shaft controlling the device authorized for use is placed in the off position. Once being placed in the off position, the range is totally inactivated. This arrangement permits the user to operate selected portions of the range, even though the locking mechanism is locked, thereby avoiding the need to lock the range at a time after all operating shafts of the range are disposed in the off position. Back burners, out of reach of children, may be utilized whilst front burners are disposed in the locked position. An oven compartment of the range may be left activated whilst the surface burners of the range may be maintained locked in the off position.

These objects, as well as other objects of the present invention, will become more readily apparent after reading the following description of the accompanying drawings.

DESCRIPTION OF THE PREFERRED EMBODIMENT

The structure and method of fabrication of the present invention is applicable to a pair of elongated bars straddling the surfaces of the operating shafts of a range. Each shaft is provided with an opening extending radially inwardly towards the center of the shaft wherein the longitudinal axis of the opening extends parallel to the longitudinal axis of both juxtaposed bars when the shafts are rotated into a position wherein the burner or oven compartment operated by each shaft is deactivated. One end of each arm of a plurality of arms is pivotably secured to the bars at a pivot axis located adjacent the exterior surface of an adjacent shaft. A helical spring biases the other end of each arm towards the adjacent shaft. Each arm carries a finger whose free end is directed towards the portion of the shaft adjacent the opening therein.

The bars may be located in a locked or unlocked position, controlled by the operation of a key operated lock. A pair of rods extend outwardly from one of the bars and cooperate with a pair of notches in a cylinder rotatably operated by the operation of the lock. When the lock is placed in an unlocked position, one of the notches cooperates with one of the rods so so to cause the bars, which are secured together, to shift slidably along a line transverse to the longitudinal axes of the shafts in a direction where the pivot axes of the arms extend a greater distance away from the surface of the shafts then the distance separating the shafts and the pivot axes when the lock is disposed in a locked position. The free ends of the fingers are caused to reside on the surface of the shafts or within the openings in the shafts when the bars are slidably located in a position corresponding to a locked position of the lock. The free ends of the fingers are caused to be located outwardly from the surface of the shafts when the bars are slidably located in a position corresponding to an unlocked position of the lock. At any time that the free end of a finger enters the opening of an adjacent shaft, such shaft must have been rotated into a position wherein the associated burner is deactivated.

Figure 1:
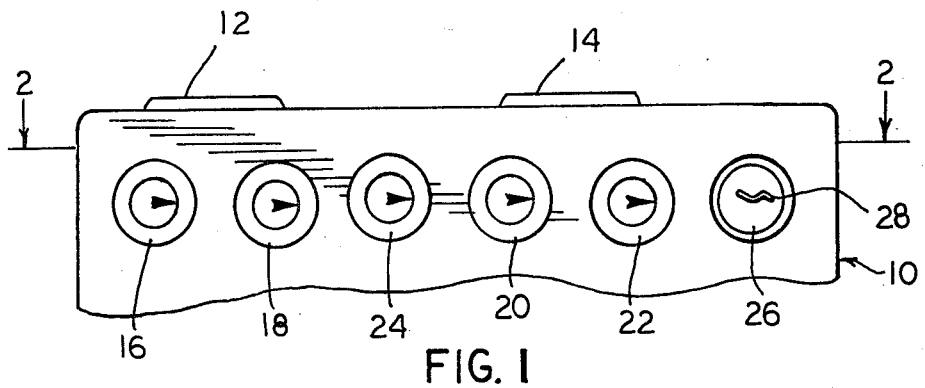
FIG. 1 is a partial front elevation view of a range equipped with the present invention.

Now referring to the Figures, and more particularly to the embodiment illustrated in FIG. 1 showing a range 10 having burners 12 and 14 and surface burner control knobs 16, 18, 20 and 22. Control knob 24 is utilized to operate an oven compartment, not shown. Lock 26 is equipped with slot 28 which permits a key, not shown, to rotatably operate the lock.

Figure 2:
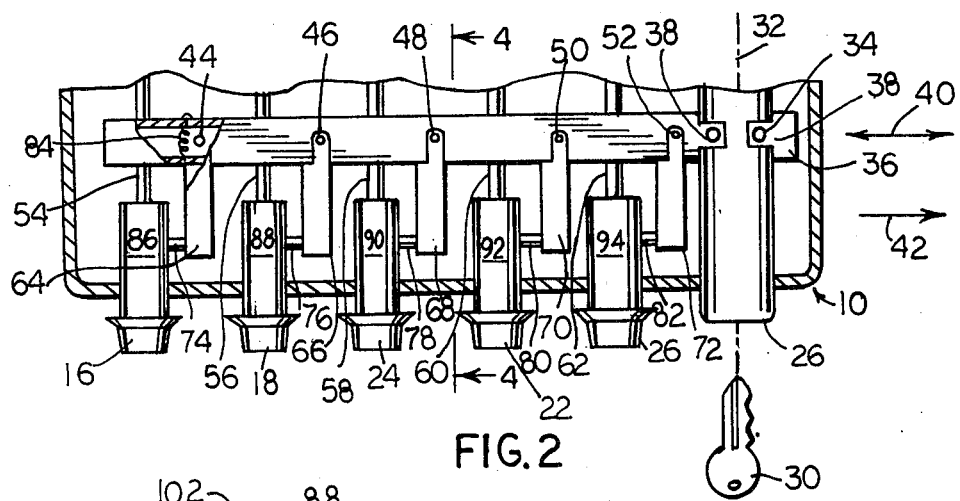
FIG. 2 is a cross-sectional plan view taken along line 2—2 viewed in the direction of arrows 2—2 as shown in FIG. 1.

FIG. 2 shows key 30 adapted to engage slot 28, shown in FIG. 1, so as to rotatably operate lock 26 about line 32. Rods 34 extend upwardly from bar 36 and are engaged within slots 38 in lock 26. When key 30 causes lock 26 to rotate, rods 34 and slots 38 cooperate so as to cause bar 36 to move in the direction of arrows 40. When lock 26 is in an unlocked position, bar 36 is disposed in the direction of arrow 42 to a location where the distance separating pivot rods 44, 46, 50 and 52 is a fixed distance from adjacent burner control shafts 54, 56, 60 and 62, respectively. This fixed distance is greater than the distance separating pivot rods 44, 46, 50 and 52 from shafts 54, 56, 60 and 62 when lock 26 is in a locked position. Similarly, pivot rod 48 is a greater distance from shaft 58 when lock 26 is in an open condition compared to when the lock is in the locked position. Arms 64, 66, 68, 70 and 72 pivot about pivot rods 44, 46, 48, 50 and 52, respectively. Fingers 74, 76, 78, 80 and 82 are affixed adjacent the free ends of arms 64, 66, 68, 70 and 72, respectively, having the free ends of the fingers directed towards their adjacent shafts and biased towards the shafts by springs, similar to spring 84, shown having one end thereof affixed to bar 36 and the other end thereof affixed to arm 64. Arms 66, 68, 70 and 72 are provided with springs, not shown, similarly located as is spring 84. The free ends of fingers 74, 76, 78, 80 and 82 are engaged touching the enlarged surfaces 86, 88, 90, 92 and 42 of shafts 54, 56, 58, 60 and 62 or reside in openings, not shown, in the surfaces.

Figure 3:
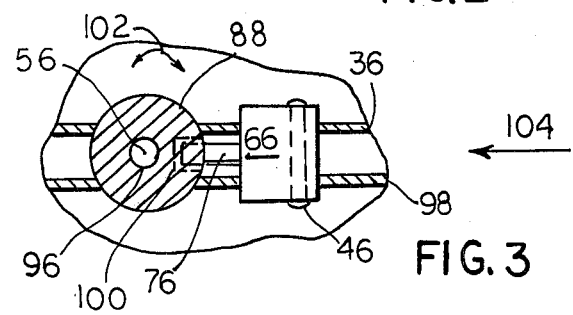
FIG. 3 is a front elevation cross-sectional view taken along line 3—3 viewed in the direction of arrows 3—3 as shown in FIG. 2.

FIG. 3 illustrates the enlarged diameter portion 88 of shaft 56 delineated by dotted lines 96. Bar 36 is shown juxtaposed and spaced apart from bar 98 straddling shaft 56. Arm 66 is shown pivoted to bars 36 and 98 utilizing pivot rod 46 therefor. Finger 76 is shown engaged within opening 100, located in surface 88. When arm 66 is disposed in the direction of arrow 32, shown in FIG. 2, finger 76 is disengaged from opening 100 permitting the rotation of shaft 56 in the directions of arrows 102. When key 30, as shown in FIG. 2, operates lock 26 into the locked position, finger 76, being biased in the direction of arrow 104, may either reside in touching engagement with portions of surface 88 or be forced to engage opening 100 when shaft 56 is rotated into a position where the open mouth portion of opening 100 surrounds the free end of finger 76. Thus, when lock 26, shown in FIG. 2, is maintained in the locked position, shaft 56 is free to rotate until such time that finger 76 first engages opening 100. Thereafter, lock 26 must be moved to the unlocked position, disposing bars 36 and 98 in the direction of arrow 42, shown in FIG. 2, to permit the unlimited rotation of shaft 56 in the directions of arrows 102.

Figure 4:
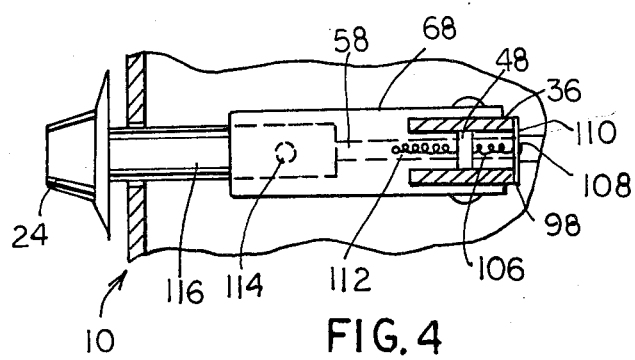
FIG. 4 is a side elevation cross-sectional view taken along line 4—4 viewed in the direction of arrows 4—4 as shown in FIG. 2.

FIG. 4 illustrates arm 68 pivotably affixed to bars 36 and 98 utilizing pivot rod 48 therefor. Spring 106 is shown having end 108 thereof affixed to sheet 110 which joins bars 36 and 98 together. End 112 of spring 106 is secured to arm 68. Opening 114 in surface 116 accommodates finger 78, shown in FIG. 2, when shaft 58 is co-axially aligned with the finger carried by arm 68.

One of the advantages of the present invention is a range locking mechanism which prohibits the unauthorized use of the range operating shafts after the shafts have been operated into a preselected position and the lock is operated into the locked position.

Another advantage of the present invention is a safety apparatus which enables the user to operate the range after the locking mechanism is locked and before all the operating shafts are rotatably aligned into a position deactivating the range heating devices.

Still another advantage of the present invention is a safety device wherein it is impossible to lock the operating shafts into a position where the range heating devices are continuously activated.

Yet another advantage of the present invention is a range safety device which may be added to existing ranges without substantially modifying the constructional features of the range.

A further advantage of the present invention is a safety device in accordance with the preceding objects, which is simple in construction, relatively inexpensive and effective for its particular purposes.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited, not by the specific disclosure herein, but only by the appending claims.

The embodiment of the invention in which an exclusive privilege or property is claimed are defined as follows:

1. In a range having a plurality of individually operated knob controlled operated shafts, each of the shafts rotatable and controlling the turning on and off of an individual cooking or heating apparatus, the improvement comprising:
   an elongated bar, the longitudinal axis of said bar being disposed tangentially slidable relative to the surface and transverse to the longitudinal axis of each of the shafts, each of the shafts being disposed in spaced apart parallel relationship to one another,
   a plurality of arms, one end of each of said arms pivotably secured to said bar at pivot axes located adjacent to each of the shafts,
   means to bias the other end of each of said arms towards an adjacent shaft thereto,
   a lock, said lock locking the pivot axes of said arms a greater distance radially outwardly from the adjacent shaft thereto when in a locked position than the distance between the adjacent shaft and the pivot axes when said lock is in an unlocked position, and
   a plurality of fingers, one end of one of said fingers fixedly secured to the other end of one of said arms, the other end of said one finger being located intermediate the adjacent shaft and the arm adjacent thereto, each of the shafts having an opening extending radially inwardly from the exterior surface thereof, said other end of said one finger being disposed located within the opening of the adjacent shaft when the opening is rotatably aligned with the longitudinal axis of said one finger and when said lock is in the locked position, said other end of said one finger being disposed outwardly of the opening when said lock is in the unlocked position.

2. The improvement as claimed in claim 1 further comprising a key, said key operating said lock selectively into the locked position and the unlocked position.

3. The improvement as claimed in claim 1 wherein said bias means comprises a helical spring, one end of said spring fixedly secured to said bar, the other end of said spring fixedly secured to said arm.

* * * * *